(12) United States Patent
Inoue

(10) Patent No.: US 8,770,895 B2
(45) Date of Patent: Jul. 8, 2014

(54) CUTTING INSERT, CUTTING TOOL, AND METHOD OF CUTTING WORKPIECE USING THEM

(75) Inventor: Yoshihiro Inoue, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 157 days.

(21) Appl. No.: 13/575,935

(22) PCT Filed: Jan. 26, 2011

(86) PCT No.: PCT/JP2011/051485
§ 371 (c)(1),
(2), (4) Date: Jul. 27, 2012

(87) PCT Pub. No.: WO2011/093333
PCT Pub. Date: Aug. 4, 2011

(65) Prior Publication Data
US 2012/0297941 A1  Nov. 29, 2012

(30) Foreign Application Priority Data
Jan. 29, 2010  (JP) .................................. 2010-019306

(51) Int. Cl.
*B23B 27/00* (2006.01)
*B23B 27/04* (2006.01)

(52) U.S. Cl.
USPC ............ 407/115; 407/113; 407/116; 407/117

(58) Field of Classification Search
USPC .......................... 407/113, 114, 115, 116, 117
See application file for complete search history.

(56) References Cited

U.S. PATENT DOCUMENTS

| | | | | |
|---|---|---|---|---|
| 5,511,911 A | * | 4/1996 | Katbi et al. | 407/114 |
| 6,238,147 B1 | * | 5/2001 | Tagtstrom et al. | 407/117 |
| 6,796,752 B2 | * | 9/2004 | Tong | 407/116 |
| 7,275,896 B2 | * | 10/2007 | Nudelman | 407/114 |
| 8,402,867 B2 | * | 3/2013 | Harif | 82/1.11 |
| 2001/0014259 A1 | * | 8/2001 | Inayama | 407/116 |

FOREIGN PATENT DOCUMENTS

| | | |
|---|---|---|
| JP | 2001-212704 | 8/2001 |
| JP | 2006-502874 | 1/2006 |
| JP | 2009-012116 | 1/2009 |
| WO | WO 2004/035257 | 4/2004 |

* cited by examiner

*Primary Examiner* — Will Fridie, Jr.
(74) *Attorney, Agent, or Firm* — Volpe and Koenig, P.C.

(57) ABSTRACT

A cutting insert having excellent chip discharge performance is provided. In the cutting insert of the present invention, a bottom surface of a concave groove 21 includes a first bottom surface 211 continuous with a cutting edge part 5, and a second bottom surface 212 which is located on a side further remote from the cutting edge part 5 than the first bottom surface 211, and is located at a lower position than a virtual extension line L1 of an end portion of the first bottom surface 211 on a side remote from the cutting edge part 5. Further, a pair of inclined surfaces 23 are located on a side further remote from the cutting edge part 5 than the end portion of the first bottom surface 211 on the side remote from the cutting edge part 5 in a top view. Therefore, the diameter of generated chips decreases by the fact that the chips are curled while sinking in space formed at a lower position than the virtual extension line L1 of the first bottom surface 211. Consequently, the chip discharge direction is stabilized, thus achieving satisfactory chip discharge performance.

14 Claims, 8 Drawing Sheets

(a)

(b)

(a)

(b)

CUTTING INSERT, CUTTING TOOL, AND METHOD OF CUTTING WORKPIECE USING THEM

TECHNICAL FIELD

The present invention relates to a cutting insert, a cutting tool, and a method of cutting a workpiece using them.

BACKGROUND ART

In cutting inserts, particularly cutting inserts for grooving process, it becomes important to reduce damage to a machined surface due to generated chips. For example, patent document 1 discloses a cutting insert for grooving process including a cutting edge having a concave part in a midportion thereof, a concave groove which is provided continuously with the concave part of the cutting edge, and has a flat bottom surface, and an inclined surface disposed behind the concave groove. Chips generated by this cutting insert are compressed in the width direction thereof by the concave groove of the cutting insert, and the width of the chips becomes smaller than a cutting edge width. Therefore, the chips are less likely to come into contact with the machined surface, thereby reducing damage to the machined surface due to the chips.

PRIOR ART DOCUMENT

Patent Document

Patent Document 1: Japanese Unexamined Patent Publication No. 2001-212704

SUMMARY OF THE INVENTION

Problems to be Solved by the Invention

However, the concave groove with the flat bottom surface disposed in the cutting insert of the patent document 1 involves the following risk. That is, the chips whose hardness is enhanced because they are compressed in the width direction become less likely to be divided by the inclined surface. This causes the disadvantage that the chips are jammed tight in the concave groove, and the like, thus deteriorating chip discharge performance.

An object of the present invention is to provide a cutting insert having excellent chip discharge performance.

Means for Solving the Problems

A cutting insert of the present invention includes a body section which includes an upper surface, a lower surface, a side surface, and a cutting edge part located at an intersection of the upper surface and the side, surface. The upper surface includes a concave groove provided continuously with the cutting edge part, and a pair of inclined surfaces which are respectively located on both sides of the concave groove, and are inclined to become higher as the pair of inclined surfaces separate from the cutting edge part. A bottom surface of the concave groove includes a first bottom surface continuous with the cutting edge part, and a second bottom surface which is located on a side further remote from the cutting edge part than the first bottom surface, and is located at a lower position than a virtual extension line of an end portion of the first bottom surface on a side remote from the cutting edge part. The pair of inclined surfaces are located on a side further remote from the cutting edge part than the end portion of the first bottom surface on the side remote from the cutting edge part in a top view.

A cutting tool of the present invention includes the cutting insert of the present invention; and a holder configured to attach the cutting insert to a front end thereof.

A method of cutting a workpiece according to the present invention includes rotating the workpiece; bringing the cutting edge part of the cutting tool near the workpiece being rotated; cutting the workpiece by bringing the cutting edge part of the cutting tool into contact with the workpiece being rotated; and separating the cutting edge part of the cutting tool from the workpiece after subjected to the cutting.

Effect of the Invention

According to the cutting insert of the present invention, the bottom surface of the concave groove includes the first bottom surface being continuous with the cutting edge part, and the second bottom surface which is located on the side further remote from the cutting edge part than the first bottom surface, and is located at the lower position than the virtual extension line of the end portion of the first bottom surface on the side further remote from the cutting edge part. Further, the pair of inclined surfaces is located on the side further remote from the cutting edge part than the end portion on the side remote from the cutting edge part of the first bottom surface in the top view. Therefore, the generated chips are curled while sinking in space formed at a lower position than the virtual extension line of the first bottom surface, thereby allowing a reduction in the curl diameter of the chips. This stabilizes the chip discharge direction, thereby improving the chip discharge performance.

BRIEF DESCRIPTION OF THE DRAWINGS

FIG. 1(b) is a side. view thereof; FIG. 1(c) is a front-end view thereof;

PREFERRED EMBODIMENTS FOR CARRYING OUT THE INVENTION

<Cutting Insert>

Embodiments of the cutting insert according to the present invention are described in detail below with reference to the accompanying drawings. The cutting tool of the present invention is applicable to any of internal grooving process, external grooving process, cut-off process, and face grooving process.

(First Embodiment)

The cutting insert 1 as the first embodiment of the cutting tool of the present invention is described with reference to FIGS. 1 to 6.

Figure 1:
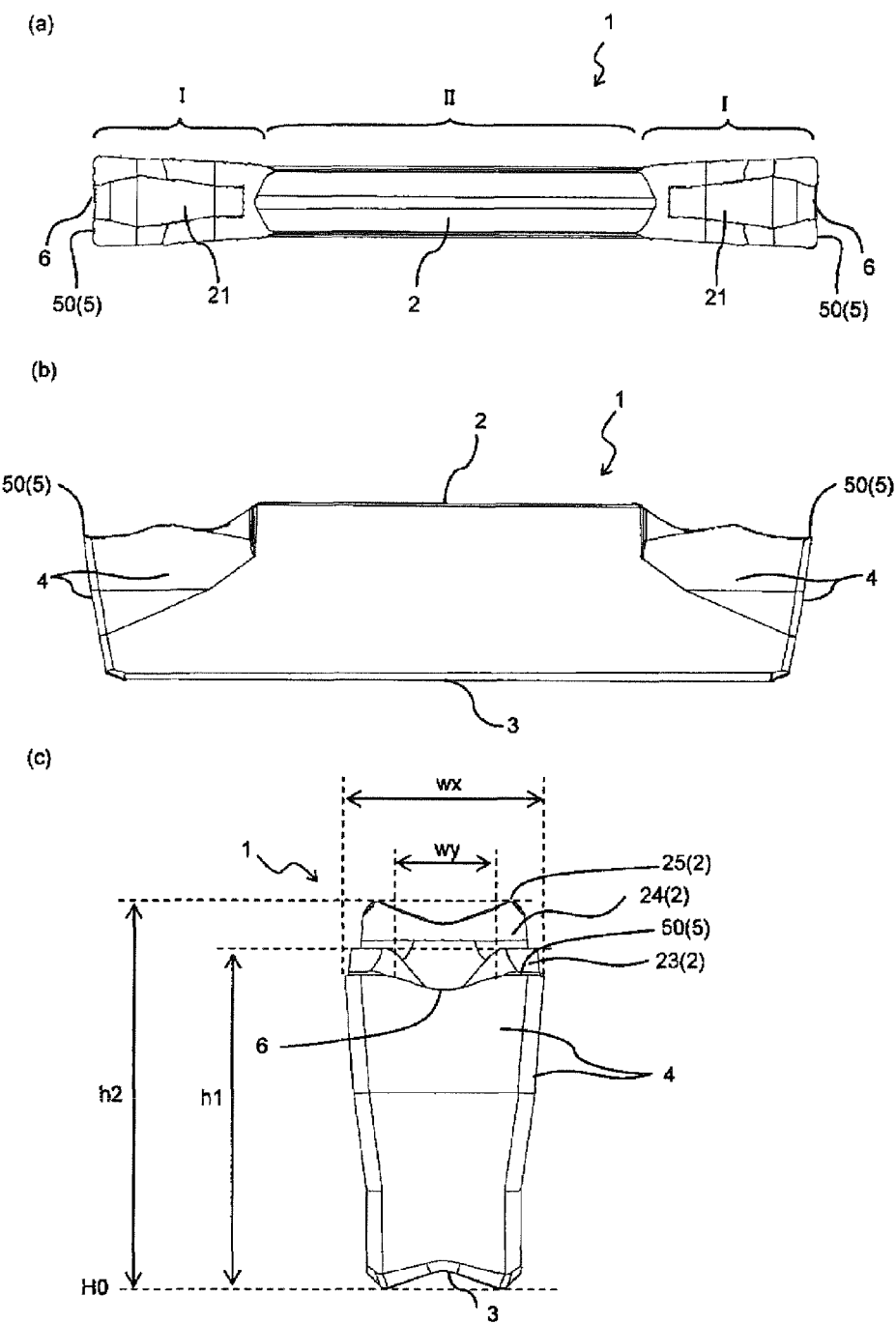
FIG. 1 is a top view showing a cutting insert according to a first embodiment of the present invention.

As shown in FIG. 1, the cutting insert 1 (hereinafter referred to simply as "insert 1" in some cases) has a prismatic shape, and has cutting parts I at both end portions thereof, and a clamp part II which is located between the cutting parts I, and has a clamp surface (described later) which is contacted with a holder when the cutting insert is fixed to the holder. That is, the cutting parts I are provided on both ends of the clamp part II. The insert 1 is used for face grooving process.

Some examples of the material of the cutting insert 1 are cemented carbide and cermet. Some examples of the composition of cemented carbide are WC-Co produced by adding powder of cobalt (Co) to tungsten carbide (WC), followed by sintering, WC—TiC—Co obtained by adding titanium carbide (TiC) to WC—Co, and WC—TiC—TaC—Co obtained by adding tantalum carbide (TaC) to WC—TiC—Co. The cermet is a sintered composite material obtained by compositing metal with ceramic ingredients, and specific examples thereof are titanium compounds composed mainly of titanium carbide (TIC) and titanium nitride (TiN).

The surface of the cutting insert 1 may be coated with a coating film by using chemical vapor deposition (CVD) method or physical vapor deposition (PVD) method. Some examples of the coating film composition are titanium carbide (TiC), titanium nitride (TIN), titanium carbonnitride (TiCN), and alumina ($Al_2O_3$).

Figure 2:
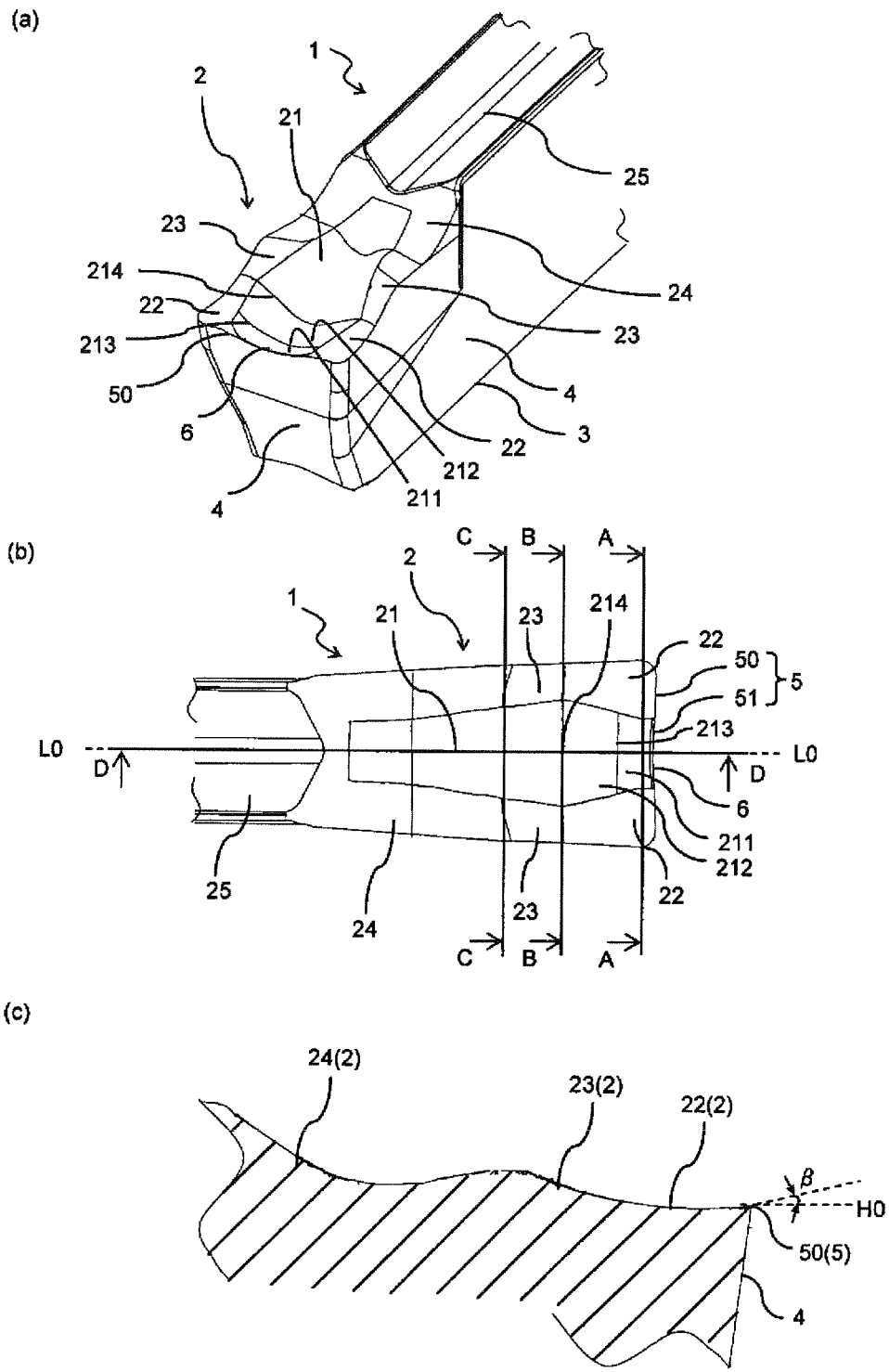
FIG. 2(a) is a partially enlarged perspective view of the cutting insert shown in FIG. 1.
FIG. 2(b) is a partially enlarged top view thereof.
FIG. 2(c) is a partially enlarged side view thereof.
Figure 3:
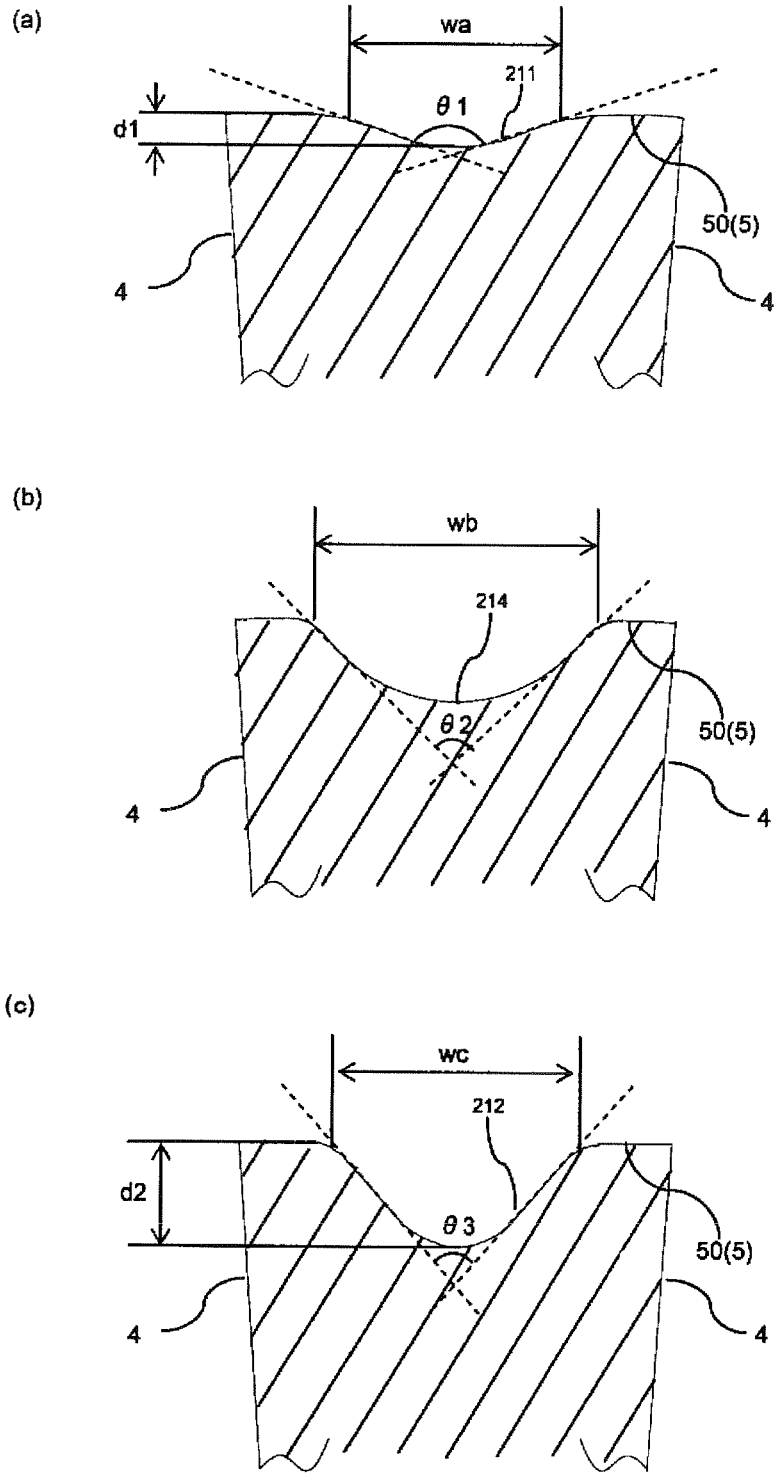
FIG. 3(a) is a sectional view taken along the line A-A in the cutting insert shown in FIG. 2(b)
FIG. 3(b) is a sectional view taken along the line B-B thereof.
FIG. 3(c) is a sectional view taken along the line C-C thereof.

As shown in FIG. 2, each of the cutting parts II includes an upper surface 2, a lower surface 3, a side surface 4 connected to the upper surface 2 and the lower surface 3. The upper surface 2 functions as a rake surface. The lower surface 3 functions as a placement surface to be placed on the holder. The side surface 4 functions as a flank surface. As shown in FIG. 2(b), the cutting part I has a polygonal shape in a top view, and in the present embodiment, it has a rectangular shape having two long sides and two short sides in the top view. In the present embodiment, a length in a longitudinal direction of the insert 1 is 20 mm, and a length in a width direction perpendicular to the longitudinal direction is 2 to 4 mm in the top view. This width decreases toward the clamp part II in order to prevent the insert from interfering with an inner wall surface of a groove machined in a workpiece during machining. A height from the lower surface 3 to the upper surface 2 in the insert 1 is 3 to 5 mm.

A cutting edge part 5 is provided at an intersection of the upper surface 2 and the side surface 4. The cutting edge part 5 includes a cutting edge 50. For example, the cutting edge 50 may be provided along any part of the intersection in the longitudinal direction or the width direction of the cutting part I. In the present embodiment, the cutting edge 50 is provided only along the intersection in the width direction of the cutting part I for the purpose of use in the face grooving process for dividing the workpiece.

In the present embodiment, the cutting edge part 5 includes a land 51. The land 51 is a flat surface provided along the cutting edge 50. A fracture of the cutting edge 50 can be reduced, and the strength of the cutting edge 50 can be improved by including the land 51.

The upper surface 2 includes a concave groove 21 provided continuously with the cutting edge part 5, and a pair of inclined surfaces 23 which are located at both sides of the concave groove 21, and are inclined to become higher as the pair of inclined surfaces 23 separate from the cutting edge part 5. In the present embodiment, as shown in FIG. 2, the concave groove 21 is continuous with a midportion of the cutting edge part 5. The concave groove 21 is provided with a pair of rake surfaces 22 respectively located on both sides thereof, and the pair of inclined surfaces 23 which are located on a side further separated from the cutting edge part 5 than the rake surface 22, and are inclined to become higher as the inclines surfaces 23 separate from the cutting edge part 5. That is, the concave groove 21 is formed passing through the rake surfaces 22 and the inclined surfaces 23.

The concave groove 21 is a long, narrow recess which is continuous with the cutting edge part 5, and extends in the longitudinal direction of the insert 1. This structure stabilizes a chip discharge direction by compressing the chips in the width direction thereof. Because the chips are compressed in the width direction thereof, the width of the chips becomes smaller than the width of the insert 1 (width of the cutting edge 50), and the chips are less likely to come into contact with the machined surface of the workpiece. This reduces damage to the machined surface. In the present embodiment, the concave groove 21 is located on a perpendicular bisector LO of the cutting edge 50 in the top view. Specifically, the concave groove 21 has a line-symmetric shape on the perpendicular bisector LO of the cutting edge 50. This structure allows the chips compressed in the width direction thereof to have a bilaterally symmetric shape, thereby further stabilizing the chip discharge direction. The chips compressed in the width direction thereof are finally discharged after being curled in the shape of a spring by the inclined surfaces 23.

As shown in FIG. 2(b), a groove width in the concave groove 21 increases as the groove width separates from the cutting edge part 5, and becomes maximum at the position of an end portion of each of the inclined surfaces 23 closer to the cutting edge part 5. The groove width is narrower on the side remote from the cutting edge part 5 than the end portion of the inclined surface 23 closer to the cutting edge part 5. To be specific, wa<wb, where wa is a groove width of the concave groove 21 in FIG. 3(a) showing the sectional view taken along the line A-A in FIG. 2(b), and wb is a groove width of the concave groove 21 in FIG. 3(b) showing the sectional view taken along the line B-B. Also, wb<wc, where we is a groove width of the concave groove 21 in FIG. 3(c) showing the sectional view taken along the line C-C. When wa<wb, a support part of the chip is shifted to the end portion as the chip flows from the cutting edge part 5 to the inclined surfaces 23, and a deflection amount of the chips toward the lower surface 3 is increased, thereby facilitating the compression of the chips in the width direction thereof. On the other hand, when wb>wc, the chips are surely guided to the concave. groove 21, thereby making it easier to stabilize a chip flow direction.

Some examples of the cross-sectional shape of the concave groove 21 which is parallel to the cutting edge 50 and perpendicular to the lower surface 3 are shapes made up of straight lines, such as V-shape, shapes made up of a curved line, such as circular arc, and shapes obtained by combining these. In the present embodiment, a circular arc shape is employed for maintaining the strength of the concave groove 21, as shown in FIGS. 3(a) to 3(c).

Further in the present embodiment, the concave groove 21 is formed so that a holding angle θ at which the concave groove 21 holds the chips decreases as the concave groove 21 separates from the cutting edge part 5. This structure allows the chips to be more surely compressed, and are discharged more stably. When the cross-sectional shape of the concave groove 21 is the circular arch shape as in the case of the present embodiment, the holding angle θ is obtained by measuring an angle formed by two virtual extension lines of opposed two surfaces. For example, θ>θ2>θ3, where θ1 is a holding angle of the concave groove 21 shown in FIG. 3(a), θ2 is a holding angle of the concave groove 21 shown in FIGS. 3(b), and θ3 is a holding angle of the concave groove 21 shown in FIG. 3(c).

In the present embodiment, as shown in FIGS. 4(a) and 4(b), the bottom surface of the concave groove 21 includes a first bottom surface 211 being continuous with the cutting edge part 5, and a second bottom surface 212 which is located on the side further remote from the cutting edge part 5 than the first bottom surface 211, and is located at a lower position than a virtual extension line L1 of an end portion of the first bottom surface 211 remote from the cutting edge part 5. This structure permits formation of space at the lower position than the virtual extension line L1 of the end portion of the first bottom surface 211 on the side remote from the cutting edge part 5. This space corresponds to space allowing the chips to sink therein when the chips try to ride on the inclined surfaces 23. To be specific, the curl diameter of the generated chips is reduced by the fact that the chips are curled while sinking in the space. This improves the chip discharge performance. Furthermore, the contact area between the chips and the concave groove 21 is decreased. Thereby, the effect of reducing frictional resistance is also produced to prevent the concave groove 21 from becoming clogged with the chips.

The first bottom surface 211 is the surface through which the bottom of the chips passes. The first bottom surface 211 is at least partially provided with a descending part 211a which becomes closer to the lower surface 3 as the descending part 211a separates from the cutting edge part 5, and a flat part 211b which is located on a side closer to the second bottom surface 212 in the descending part 211a, and has a constant height from the lower surface 3. Owing to this structure, the chips are likely to be guided to the foregoing space, and therefore are more likely to sink therein. Also in the present embodiment, as shown in FIG. 4(b), letting a reference plane which passes through the cutting edge part 5 and is parallel to a horizontal plane be HO, an inclination angle a formed by the descending part 211a and the reference plane HO is 10° to 30°.

The second bottom surface 212 includes a descending part 212a which becomes closer to the lower surface 3 as the descending part 212a separates from the cutting edge part 5, and an ascending part 212b which is located on a side further remote from the cutting edge part 5 than the descending part 212a, and becomes higher as the descending part 212a separates from the cutting edge part 5. Specifically, the ascending part 212b is formed at a position corresponding to the inclined surface 23. Owing to this structure, when the chips move forward along the inclined surface 23, the chips graze the ascending part 212b, thereby further stabilizing the chip discharge. The term "corresponding" denotes a state in which one portion is located on a straight line passing through the other portion.

In the present embodiment, the depth of the second bottom surface 212 is preferably greater than a depth of the first bottom surface 211 in a sectional view in a cross section which is parallel to the cutting part 5 and intersects the lower surface 3. Specifically, d1<d2, where d1 is a depth of the first bottom surface 211 in FIGS. 3(a), and d2 is a depth of the second bottom surface 212 in FIG. 3(c). This structure further ensures the foregoing space, resulting in excellent chip discharge performance.

Figure 4:
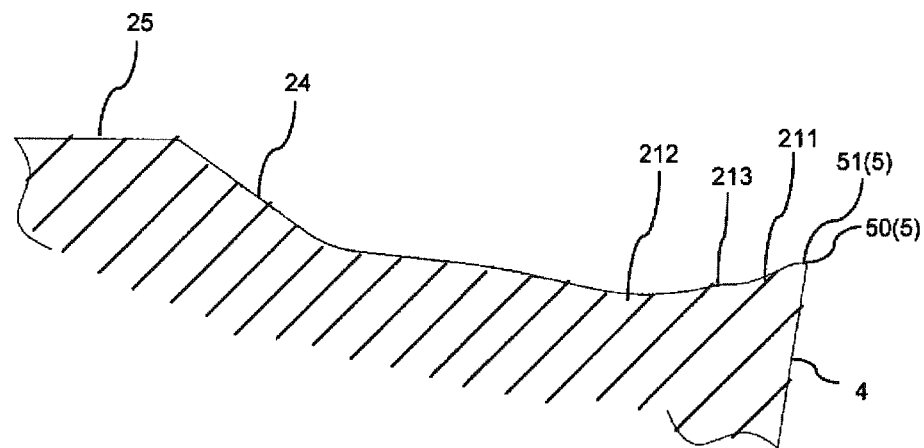
FIG. 4(a) is a sectional view taken along the line D-D in the cutting insert shown in FIG. 2(b)
FIG. 4(b) is a partially enlarged view of FIG. 4(a)
Figure 4:
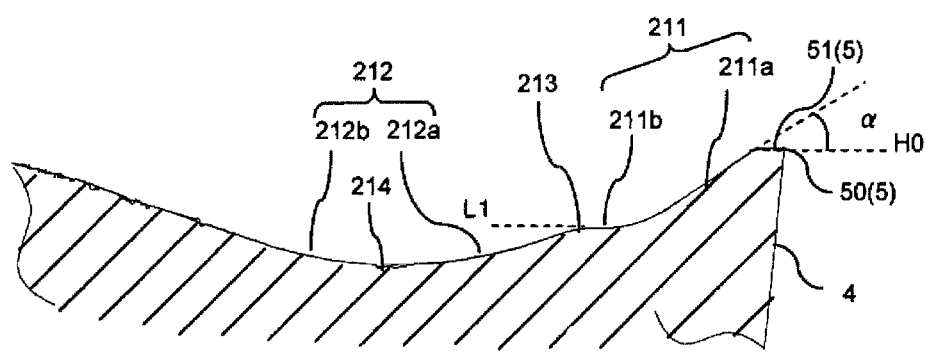

In the present embodiment, the descending part 212a and the ascending part 212b are formed continuously with each other on the second bottom surface 212, as shown in FIG. 4. The second bottom surface is the deepest at the boundary of the descending part 212a and the ascending part 212b. Specifically, the phrase "boundary of the descending part 212a and the ascending part 212b" denotes a second connection part 214 as a connection part between the descending part 212a and the ascending part 212b, as shown in FIG. 2(a). In the present embodiment, the ascending part 212b is formed continuously with the descending part 212a.

Alternatively, the ascending part 212b may include a connection surface made up of small curved surfaces, such as chamfers, which can be provided in terms of manufacturing. In the present embodiment, the second connection part 214 corresponds to the deepest portion of the concave groove 21 in a cross-sectional view in a cross section perpendicular to the cutting edge part 5.

Further in the present embodiment, in the cross-sectional view in the cross section perpendicular to the cutting edge part 5, the deepest portion of the second bottom surface 212 (the second connection part 214) is located closer to the cutting edge part 5 than the position of the end portion of each of the pair of inclined surfaces 23 closer to the cutting edge part 5 in a planar view. This structure ensures that the foregoing space has a larger area.

In the present embodiment, the second connection part 214 is formed substantially parallel to and along the cutting edge part 5. Owing to this structure, the chips receive frictional resistance on their portions parallel to the cutting edge 50, thereby further stabilizing the chip flow direction.

No special limitation is imposed on the ratio of the area of the first bottom surface 211 and the area of the second bottom surface 212 on the bottom surface. From the viewpoint of ensuring the large space, for example, the area of the second bottom surface 212 is preferably larger than the area of the first bottom surface 211 in the top view, to the extent that it won't hinder the effect of the present invention.

In the present embodiment, as shown in FIG. 2(b), the first bottom surface 211 and the second bottom surface 212 are formed to extend in the width direction of the concave groove 21. This structure ensures that the space has a larger area, resulting in the excellent chip discharge performance.

Further in the present embodiment, the first bottom surface 211 and the second bottom surface 212 are continuous with each other, and the boundary of the first bottom surface 211 and the second bottom surface 212 is formed substantially parallel to and along the cutting edge part 5. Specifically, as shown in FIG. 2(b), the phrase "the boundary of the first bottom surface 211 and the second bottom surface 212" denotes the connection part 213. From the connection part 213, the chips temporarily shifts from a state in which the chips are contacted with the bottom surface of the concave groove 21, to a state in which the chips are not contacted therewith. Owing to this structure, the shift between the contact states with the bottom surface of the chips are substantially synchronized with each other in the lateral direction of the chips, thereby further stabilizing the chip flow direction. The phrase "substantially parallel to and along the cutting edge part 5" denotes a state in which a target portion with respect to the cutting edge 50 is in an angle in the range of 0°±2°. In the present embodiment, as shown in FIG. 4, the connection part 213 is formed by a surface, and the first bottom surface 211 and the second bottom surface 212 are connected to each other by interposing therebetween a connection surface made up of small curved surfaces, such as chamfer, which is provided in terms of manufacturing are connected to each other. This structure reduces cracking in the bottom surface of the concave groove 21, thereby maintaining the strength of the insert 1.

In the present embodiment, the cutting edge part 5 includes a concave part 6 which is lowered toward the center thereof, as shown in FIG. 1(c). That is, the concave part 6 of the cutting part 5 and the concave groove 21 are continuous with each other. The chips, whose midportion has a concave shape in a sectional view, are generated by concave part 6. This facilitates compression of the chips in the width direction thereof by the concave groove 21.

No special limitation is imposed on the shape and size of the concave part 6. Some examples of the shape of the concave part 6 are shapes made up of straight lines, such as V-shape, shapes made up of a curved line, such as circular arc, and shapes obtained by combining these. In the present embodiment, the circular arc shape is preferred, as shown in FIG. 1(c). Further in the present embodiment, the width of the concave part 6 is ½ to ⅔ times the length of the cutting edge 50 in order to maintain the strength of the end portion of the cutting edge 50. Specifically, the ratio of wx and xy, namely, wy/wx=½ to ⅔, where wx is a width of the cutting edge 50, and wy is a width of the concave part 6, as shown in FIG. 1(c).

The rake surface 22 is the surface through which the generated chips graze, and is formed to have a rake angle so that the rake surface 22 comes closer to the lower surface 3 as the rake surface 22 separates from the cutting edge part 5. An angle formed by the reference plane HO which passes through the cutting edge part 5 and is parallel to the horizontal plane, and a virtual extension line of the rake surface 22 is referred to as a "rake angle." Specifically, the rake angle is an angle β formed by the reference plane HO which passes through the cutting edge part 5 and is parallel to the horizontal plane, and the rake surface 22. The rake angle β is preferably set to approximately 5° to 10°. The inclination angle a of the first bottom part 211a is larger than the rake angle β of the rake surface 22. Owing to this structure, the generated chips are more likely to be compressed. Consequently, the thickness of the midportion of the chips is smaller than the thickness of the end portions thereof. Therefore, the generated chips are more likely to be compressed in the width direction thereof.

The inclined surfaces 23 are provided for dividing the chips or changing their shape into the spring-shape. As shown in FIG. 2, the present embodiment further includes rear inclined surfaces 24 on the side further remote from the cutting edge part 5 and at a higher position than the pair of inclined surfaces 3. Owing to this structure, even when the chips having low rigidity ride on the inclined surfaces 23 without being divided, they can be divided by the rear inclined surfaces 24. In the present embodiment, the inclined surfaces 23 have an inclination angle of 34° when the width wx of the cutting edge 5 is 3 mm, and the height of the rear inclined surfaces 24 from the cutting edge 5 is approximately 0.35 mm.

The rear inclined surfaces 24 are located on the side further remote from the cutting edge part 5 than the concave groove 21, and have a larger inclination angle than the inclination angle of the inclined surfaces 23 with respect to the reference plane HO which passes through the cutting edge part 5 and is parallel to the horizontal plane. Owing to this structure, even when the chips having low rigidity ride on the inclined surfaces 23 without being divided, they can be divided by the rear inclined surfaces 24. The inclination angles of the inclined surfaces 23 and the rear inclined surfaces 24 are set in the range of approximately 30° to 35° according to cutting conditions. In the present embodiment, the inclination angle of the rear inclined surfaces 24 is 35°.

The rear inclined surfaces 24 are provided continuously with a clamp surface 25. The clamp surface 25 is the surface which is brought into contact with the holder when the insert 1 is fixed to the holder. An end portion of each of the rear inclined surfaces 24 closer to the clamp surface 24 is located at the highest position in the upper surface 2. In the present embodiment, as shown in FIG. 1(c), h1<h2, where h1 is a height of a top portion of the inclined surface 23, and h2 is a height of the rear inclined surface 24. Owing to this structure, the chips passed through without being divided on the inclined surface 23 can be surely divided on the rear inclined surface 24 located at the higher position than the top portion of the inclined surface 23, thereby discharging them outside of the machined groove.

(Second Embodiment)

Figure 5:
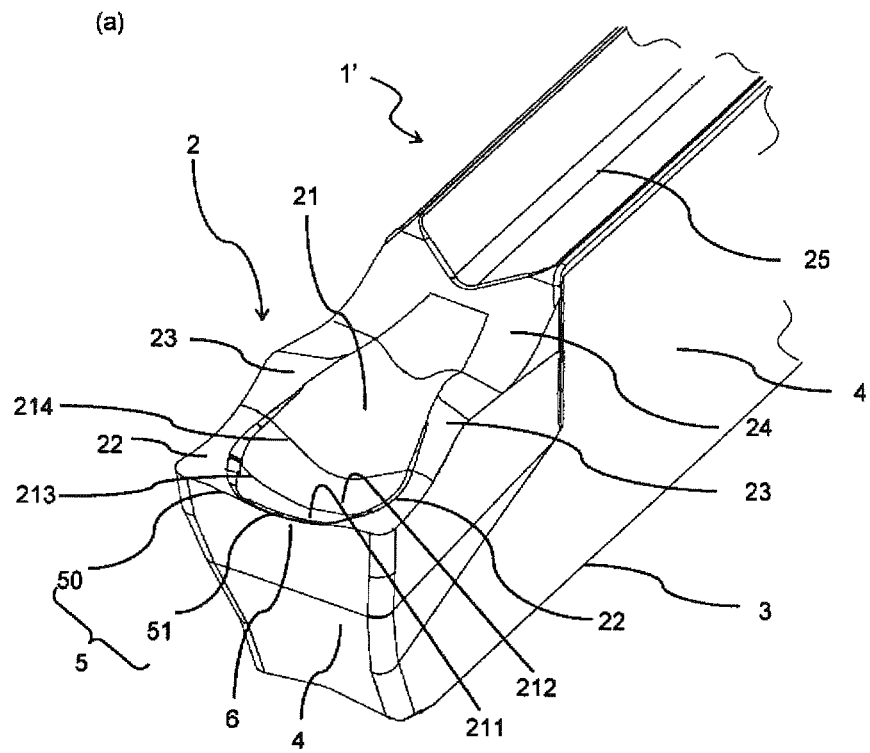
FIG. 5(a) is a partially enlarged perspective view of a cutting insert according to a second embodiment of the present invention.
FIG. 5(b) is a partially enlarged top view thereof.
Figure 5:
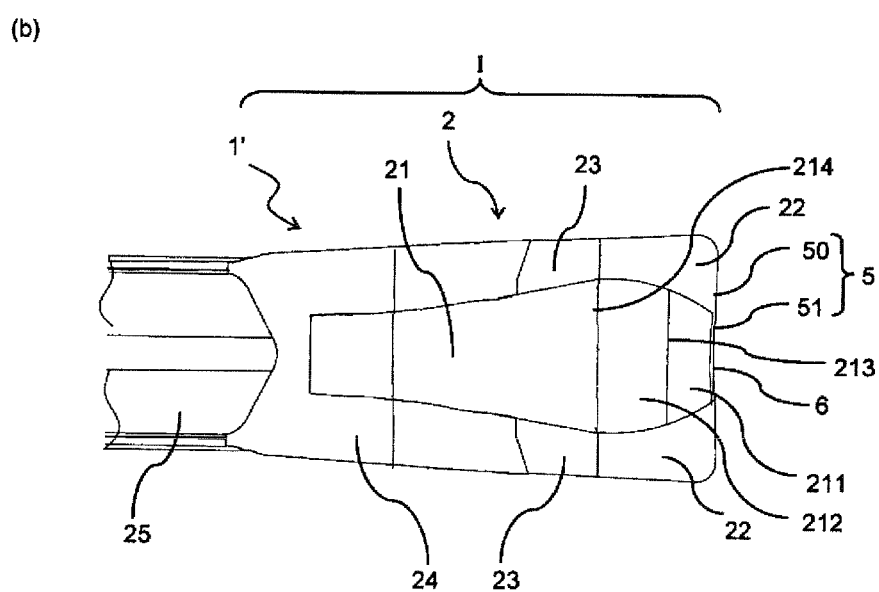

FIG. 5 is the drawing showing a cutting insert 1' as a second embodiment. As shown in FIGS. 5(a) and 5(b), a portion corresponding to the rake surface 22 is curved so that the width of the concave groove 21 increases as this portion separates from the cutting edge part 5. On the other hand, a portion corresponding to the inclined surface 23 has a shape so that the width of the concave groove 21 decreases as this portion separates from the cutting edge part 5. This shape ensures a larger groove width than the groove width of the concave groove 21 of the first embodiment, thus making it easier to deflect the generated chips in the direction of the lower surface 3. Consequently, the chips can be compressed satisfactorily.

(Third Embodiment)

Figure 6:
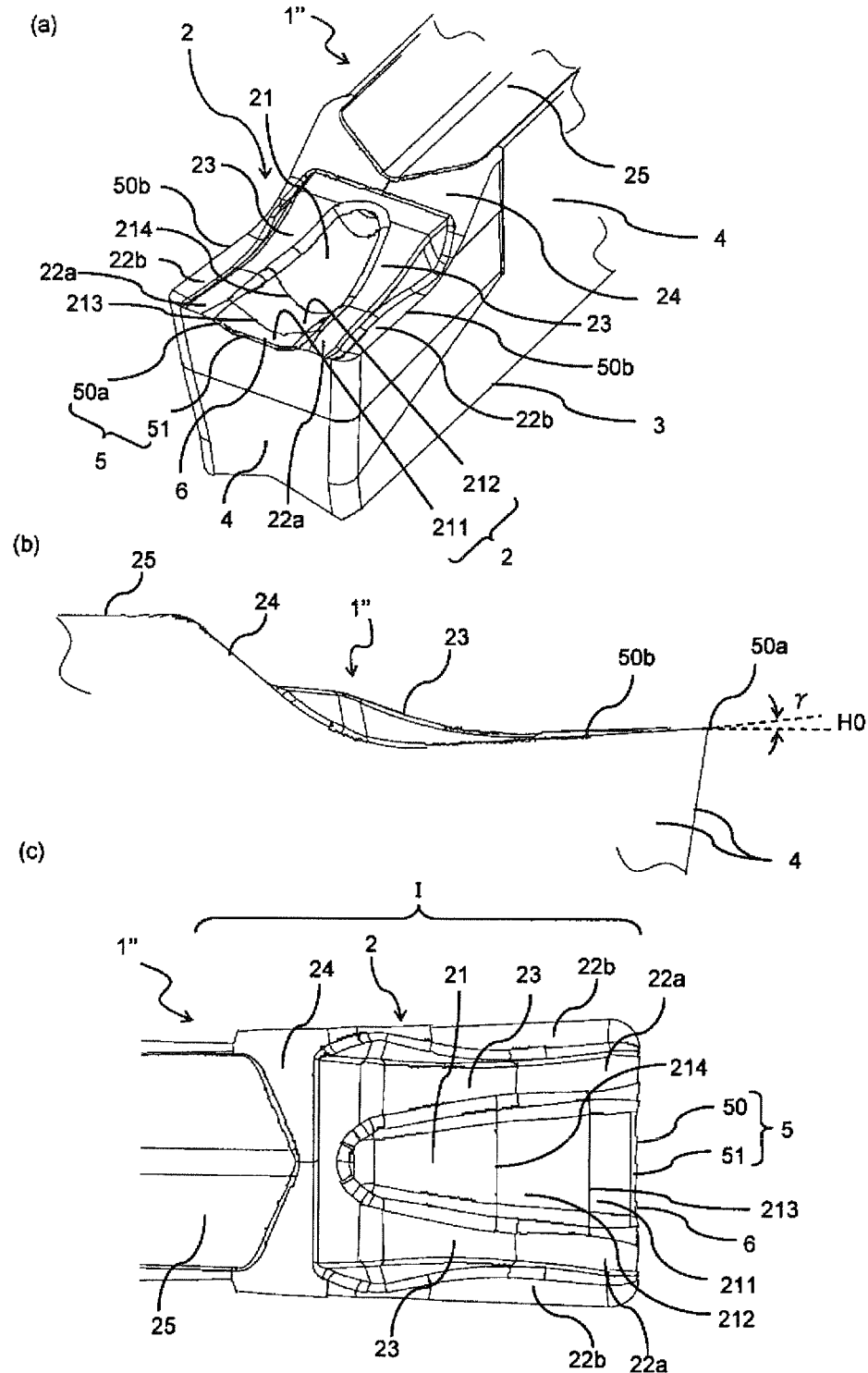
FIG. 6(a) is a partially enlarged perspective view of a cutting insert according to a third embodiment of the present invention.
FIG. 6(b) is a partially enlarged side view thereof.
FIG. 6(c) is a partially enlarged top view thereof.

FIG. 6 is the drawing showing a cutting insert 1" as a third embodiment. The insert 1" is used in face grooving process in which an annular groove is machined on an end surface of a workpiece.

The insert 1" is also used in horizontal-feed machining for enlarging a groove width, besides vertical-feed machining for forming a groove in the workpiece. Therefore, a cutting edge 50a is provided in a width direction of the cutting part I, and a cutting edge 50b is provided in a longitudinal direction thereof. Hence, the insert 1" is provided with a rake face 22a inclined to come closer to the lower surface 3 as the rake surface 22a separates from the cutting edge 50a, and a rake surface 22b inclined to come closer to the lower surface 3 as the rake surface 22b separates from the cutting edge 50b. The cutting edge 50b is inclined at an inclination angle γ so as to come closer to the lower surface 3 as the cutting edge 50b separates from the cutting edge 50a in the longitudinal direction of the cutting part I. The amount of generated chips increases with increasing the length of a part of the cutting edge 50b which contributes to cutting. This structure permits more satisfactory division even when the amount of chips generated by the cutting edge 50b is large.

In the present embodiment, a groove width of the concave groove 21 decreases as the groove width separates from the cutting edge 50a in a top view. This structure allows the chips generated by the cutting edge 50a to be continuously compressed in the width direction thereof in the concave groove 21, thereby stabilizing the chip flow direction.

In the present embodiment, the inclined surfaces 23 are inclined gently compared to those in the first and second embodiments. In the face grooving process, the inclined surfaces 23 are provided for helically curling the chips. Therefore, compared to the application to other machining mode, the inclined surfaces 23 preferably have a smaller inclination angle and a longer distance from the cutting edge 50a. To be specific, the inclined surfaces 23 are located behind the concave groove 21 in the present embodiment. The inclined surfaces 23 are set to an inclination angle in the range of approximately 20° to 30° according to cutting conditions. In the present embodiment, the inclination angle of the inclined surfaces 23 is 27°, and the height thereof from the cutting edge 50 is 0.35 mm.

<Cutting Tool>

Figure 7:
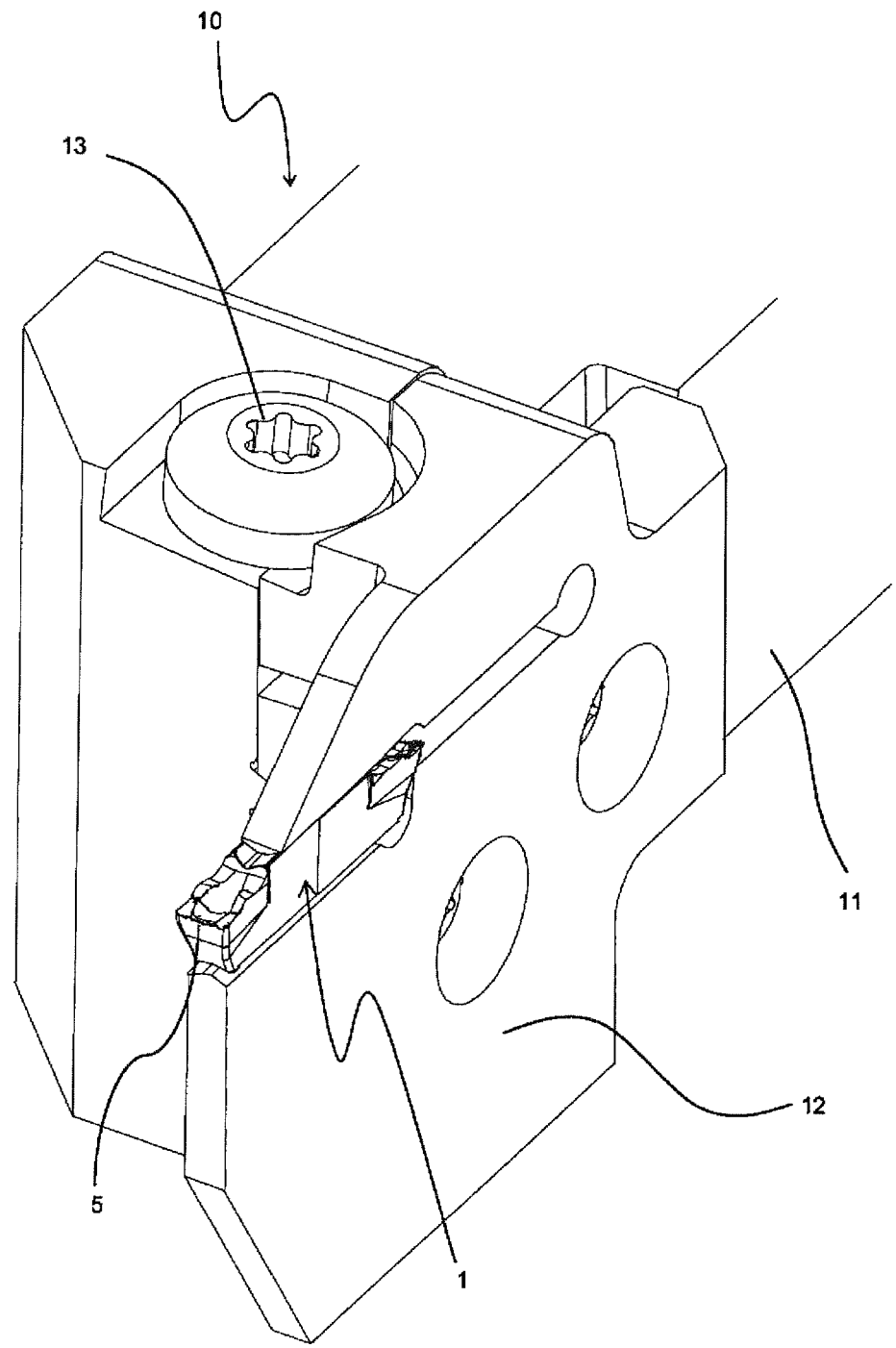
FIG. 7 is a partially enlarged perspective view showing an example of the cutting tool of the present invention.

An example of the cutting tool of the present invention is described by illustrating the case of using the insert 1, with reference to FIG. 7.

As shown in FIG. 7, a cutting tool 10 of the present embodiment includes the insert 1, and a prismatic holder 11 having a holding part 12 for holding the insert 1 at the front end thereof. The insert 1 is attached to the front end of the holder 11 so that the insert 1 is held with the cutting edge part 5 protruding from the front end of the holding part 12. In the present embodiment, the holding part 12 and the holder 11 permit attachment and detachment. From the viewpoint of improving durability, the holder 11 and the holding part 12 may be formed integrally. The present embodiment employs a method for constraining the insert 1 by adjusting constraining force with a screw 13 installed at the front end of the holder 11, and by holding' down the insert 1 from above. The method for constraining the insert 1 is not limited thereto.

<Method of Cutting Workpiece>

Figure 8:
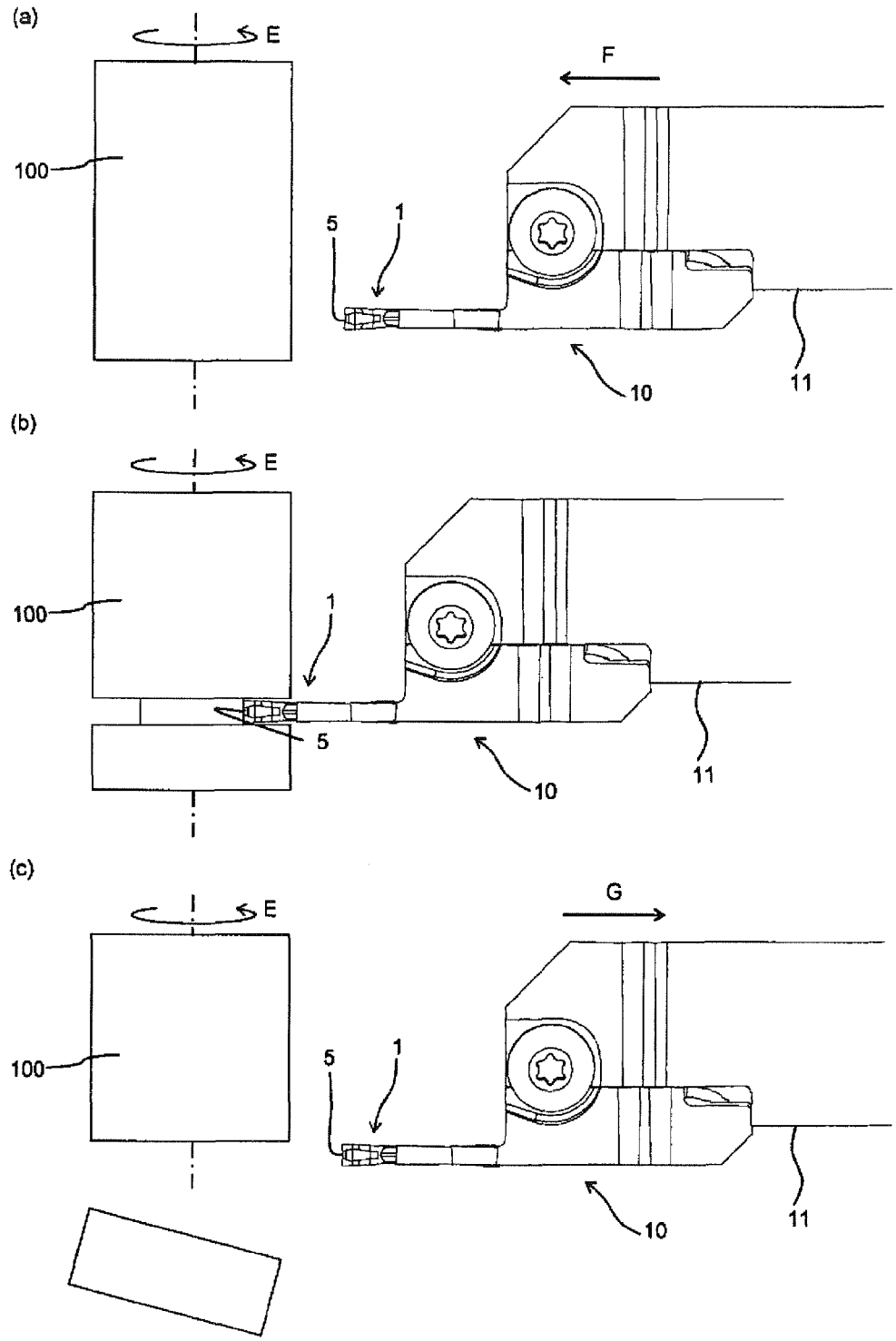
FIGS. 8(a) to 8(c) are schematic diagrams showing an example of the method of cutting a workpiece according to the present invention.

An example of the method of cutting a workpiece by using the cutting tool 10 of the present invention is described with reference to FIG. 8. The cutting tool 1 employs the cutting insert 1 applied to cut-off process, and is therefore applied to the cut-off process.

The method of cutting the workpiece by using the cutting tool 10 includes the following steps (i) to (iv).

(i) rotating the workpiece 100 in a direction of arrow E, as shown in FIG. 8(a);

(ii) bringing the cutting edge part 5 of the cutting tool 10 near the workpiece 100 being rotated, by moving the cutting tool 10 in a direction of arrow F;

(iii) cutting the workpiece 100 by bringing the cutting edge part 5 of the cutting tool 10 into contact with the workpiece 100 being rotated, as shown in FIG. 8(b); and (iv) separating the cutting edge part 5 of the cutting tool 10 from the workpiece 100 after subjected to the cutting, by moving the cutting tool 10 in a direction of arrow G, as shown in FIG. 8(c).

In the step (i), the workpiece 100 and the cutting tool 10 may be brought near each other. For example, the workpiece 100 may be brought near the cutting tool 10. Similarly, in the step (iv), the workpiece 100 and the cutting tool 10 may be separated from each other. For example, the workpiece 100 may be separated from the cutting tool 10. In the step (iii), during the grooving process, the vertical-feed machining for forming the groove is carried out, and the horizontal-feed machining for enlarging the groove width is carried out. When the cutting process is continued, it is required to repeat the step of bringing the cutting edge part 5 of the cutting tool 10 into contact with different portions of the workpiece 100 while holding the rotation of the workpiece 100. In the present embodiment, because the method is applied to the cut-off process, the vertical-feed machining is repeated until the workpiece is divided. The insert 1 is a two-corner type insert. Therefore, when one of the cutting edges 5 in use is worn, the other cutting edge 5 not yet used may be used.

Representative examples of the material of the workpiece 100 are carbon steel, alloy steel, stainless steel, cast iron, and non-iron metals.

Description of Reference Numerals 1, 1', 1" cutting insert
2 upper surface
21 concave groove
211 first bottom surface
211a descending part
211b flat part
212 second bottom surface
212a descending part
212b ascending part
213 first connection part
214 second connection part
22 (22a, 22b) rake surface
23 inclined surface
24 rear inclined surface
25 clamp surface
3 lower surface
4 side surface
5 cutting edge part
50 (50a, 50b) cutting edge
51 land
6 concave part
10 cutting tool
11 holder
12 holding part
13 screw
100 workpiece

The invention claimed is:

1. A cutting insert, comprising:
a body section comprising an upper surface, a lower surface, a side surface, and a cutting edge part located at an intersection of the upper surface and the side surface, wherein
the upper surface comprises a concave groove provided continuously with the cutting edge part, and a pair of inclined surfaces which are respectively located on both sides of the concave groove and are inclined higher as the pair of inclined surfaces separate from the cutting edge part,
a bottom surface of the concave groove comprises a first bottom surface continuous with the cutting edge part, and a second bottom surface which is located further remote from the cutting edge part than the first bottom surface and is located at a lower position than a virtual extension line of an end portion of the first bottom surface on a side further remote from the cutting edge part, and
the pair of inclined surfaces are located further remote from the cutting edge part than the end portion of the first bottom surface on the side further remote from the cutting edge part in a top view.

2. The cutting insert according to claim 1, wherein the second bottom surface comprises
a descending part which gets closer to the lower surface as the descending part separates from the cutting edge part, and
an ascending part which is located further remote from the cutting edge part than the descending part, and becomes higher as the ascending part separates from the cutting edge part.

3. The cutting insert according to claim 1, wherein the first bottom surface comprises a descending part which gets closer to the lower surface as the descending part separates from the cutting edge part in at least a part of the first bottom surface, and a flat part which is located on a side closer to the second bottom surface, and has a constant height from the lower surface in the descending part.

4. The cutting insert according to claim 1, wherein a depth of the second bottom surface is greater than a depth of the first bottom surface in a sectional view in a cross section which is parallel to the cutting edge part and intersects the lower surface.

5. The cutting insert according to claim 1, wherein a deepest portion of the bottom surface of the concave groove in a sectional view in a cross section perpendicular to the cutting edge part is located closer to the cutting edge part in a planar view than the end portion of each of the pair of inclined surfaces which is closer to the cutting edge part.

6. The cutting insert according to claim 1, the first bottom surface and the second bottom surface extend in a width direction of the concave groove.

7. The cutting insert according to claims 1, the first bottom surface and the second bottom surface are continuous with each other, and a boundary of the first bottom surface and the second bottom surface is formed substantially parallel to and along the cutting edge part.

8. The cutting insert according to claim 1, wherein the cutting edge part comprises a concave part lowered toward a midportion thereof in a side view.

9. The cutting insert according to claim 8, wherein a width of the concave part is from ½ to ⅔ of a length of the cutting edge part.

10. The cutting insert according to claim 3, wherein an angle formed by the descending part in the first bottom surface and a reference plane which passes through the cutting edge part and is parallel to a horizontal plane is larger than an angle formed by an end portion of the upper surface closer to the cutting edge part and the reference plane which passes through the cutting edge part and is parallel to the horizontal plane.

11. The cutting insert according to claim 1, wherein the upper surface further comprises a rear inclined surface which is located further remote from the cutting edge part and at a higher position than the pair of inclined surfaces.

12. The cutting insert according to claim 11, wherein the rear inclined surface is located further remote from the cutting edge part than the concave groove, and has an inclination angle larger than an inclination angle of the first inclined surface with respect to a reference plane which passes through the cutting edge and is parallel to a horizontal plane.

13. A cutting tool, comprising:

a cutting insert according to claim 1; and a holder configured to attach the cutting insert to a front end thereof.

14. A method of cutting a workpiece by using the cutting tool according to claim 13, comprising:

rotating the workpiece;

bringing the cutting edge part of the cutting tool near the workpiece being rotated;

bringing the cutting edge part of the cutting tool into contact with the workpiece being rotated so as to cut the workpiece; and separating the cutting edge part of the cutting tool from the workpiece being cut.

* * * * *